United States Patent
Buchta et al.

(10) Patent No.: US 7,607,716 B2
(45) Date of Patent: Oct. 27, 2009

(54) MOTOR VEHICLE DOOR STRUCTURE

(75) Inventors: Christoph Buchta, Neuried (DE); Uwe Ruecker, Newmarket (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 392 days.

(21) Appl. No.: 10/573,101

(22) PCT Filed: Oct. 7, 2004

(86) PCT No.: PCT/CA2004/001784

§ 371 (c)(1), (2), (4) Date: Mar. 23, 2006

(87) PCT Pub. No.: WO2005/035287

PCT Pub. Date: Apr. 21, 2005

(65) Prior Publication Data

US 2007/0039245 A1 Feb. 22, 2007

(51) Int. Cl.
*B60J 7/00* (2006.01)
(52) U.S. Cl. .............................. 296/146.6; 296/187.12
(58) Field of Classification Search ............... 296/146.6, 296/146.5, 187.12, 146.11; 49/502
See application file for complete search history.

(56) References Cited

U.S. PATENT DOCUMENTS

| 4,794,735 | A | 1/1989 | Batchelder et al. |
| 5,536,060 | A | 7/1996 | Rashid et al. |
| 6,343,832 | B1 | 2/2002 | Queener et al. |
| 6,969,107 | B2 * | 11/2005 | Omori et al. ............. 296/146.6 |
| 2002/0093219 | A1 | 7/2002 | Traister et al. |

FOREIGN PATENT DOCUMENTS

GB           2 101 535 A        1/1983

* cited by examiner

*Primary Examiner*—Joseph D Pape
(74) *Attorney, Agent, or Firm*—Clark Hill PLC (57) ABSTRACT

A vehicle door assembly has an inner sheet metal layer (16) which presents a substantially U-shaped structure. The inner sheet metal layer includes a latch mounting surface and at least one hinge mounting surface. An outer, substantially planar, sheet metal layer (14) is attached to the inner sheet metal layer to form a cavity. A structural reinforcement member (30) is disposed in the cavity to reinforce the inner and outer sheet metal layers, including reinforcements (44A, B and 28 A, B) for the latch and hinge mounting surfaces. A carrier assembly (60) is mounted to the structural reinforcement member, covering the U-shaped area, and a trim component (50) covers the carrier assembly. By incorporating the structural door member, the thickness of the inner and outer sheet metal layers can be reduced, for a net weight and reduced material cost savings.

11 Claims, 10 Drawing Sheets

MOTOR VEHICLE DOOR STRUCTURE

FIELD OF THE INVENTION

The invention relates to the construction of a motor vehicle door. More particularly, the invention relates to a reinforcement member for a vehicle door and a cooperating door module assembly that collectively enable the vehicle door to be rapidly and easily assembled whilst enabling material costs of the vehicle door to be reduced.

DESCRIPTION OF RELATED ART

A motor vehicle door typically includes a structural door body having an outer sheet metal panel and an inner sheet metal panel, a plurality of hardware components mounted within an inner cavity formed between the outer and inner sheet metal panels, and an interior trim panel. The complete assembly of the door involves multiple manufacturing steps and numerous parts. In order to reduce the complexity of manufacturing, it is known to incorporate many of the hardware components onto a door module assembly which can then be installed in the structural door body. However, this introduces its own set of problems in that the module is typically bulky and it can be difficult to install various hardware components, such as a latch, onto the structural door body due to restricted access.

Moreover, the door module assembly does not reduce the complexity or cost of manufacturing the structural door body in the first instance and may in fact add to this cost. For example, if the hardware components are attached to an inexpensive non-structural substrate in which case most of the hardware has to be bolted on to the structural door body, which has to be sufficiently rigid to be able to withstand the stresses provided by these components. Consequently, at high stress points such as latches the structural door body is often reinforced with tailor blanks. In the alternative, a structural carrier can be used for the door module assembly, but this can add significantly to material costs.

It is desirable, however, to be able to reduce the material costs of the structural door body whilst using a door module assembly employing an inexpensive non-structural substrate.

SUMMARY OF THE INVENTION

According to one aspect of the invention a structural automotive door body is provided which includes an inner sheet metal layer and an outer sheet metal layer. The inner sheet metal layer presents a latch mounting surface and at least one hinge mounting surface. A structural reinforcement member is disposed between the inner and outer sheet metal layers to reinforce the inner and outer sheet metal layers and provide at least one hinge reinforcement and a latch reinforcement.

In the preferred embodiment, the structural reinforcement member provides the necessary torsional rigidity to enable the inner sheet metal layer to be provided in the form of a U-shaped structure as well as to reduce the thickness of the inner and outer sheet metal layers, including eliminating the need for tailor blanking. Although the structural door member adds weight, the net effect is a reduced weight and hence reduced material costs.

According to another aspect of the invention, a structural automotive door body is provided which includes an inner sheet metal layer defining a substantially U-shaped structure and an outer sheet metal layer. At least one of the inner and outer sheet metal layers includes a latch mounting surface and at least one hinge mounting surface. A structural reinforcement member is disposed between the inner and outer sheet metal layers. This member includes top, middle and bottom cross-members and contiguous side peripheries. The top member abuts and extends across the outer panel adjacent to the top portion of the U-shaped structure. The middle cross member extends between the side peripheries to function as a side impact beam. The bottom cross-member abuts and supports the inner and outer sheet metal layers. The side peripheries include at least one hinge reinforcement and a latch reinforcement.

Another aspect of the invention relates to the structural door reinforcement, in and of itself.

Another aspect of the invention relates to an automotive door assembly which includes inner and outer sheet metal layers. The inner sheet metal layer defines a substantially U-shaped structure and including a latch mounting surface and at least one hinge mounting surface. A structural reinforcement member is disposed between the inner and outer sheet metal layers for reinforcing the inner and outer sheet metal layers and providing at least one hinge reinforcement and a latch reinforcement. A carrier assembly is mounted to at least the structural reinforcement member and covers the U-shaped area. The carrier assembly includes a belt-line loading member connected to a non-structural hardware carrier that has at least a window regulator mounted thereon. A trim component covers the carrier assembly.

In the preferred embodiment, the hardware carrier includes a secondary trim component which provides a shelf structure for a map pocket and the trim component includes a wall for the map pocket.

In addition, the preferred window regulator includes at least one rail having one end mounted to the belt-line loading member and means for adjusting the lateral and vertical position of the other end of the rail.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF PREFERRED EMBODIMENTS

Figure 1:
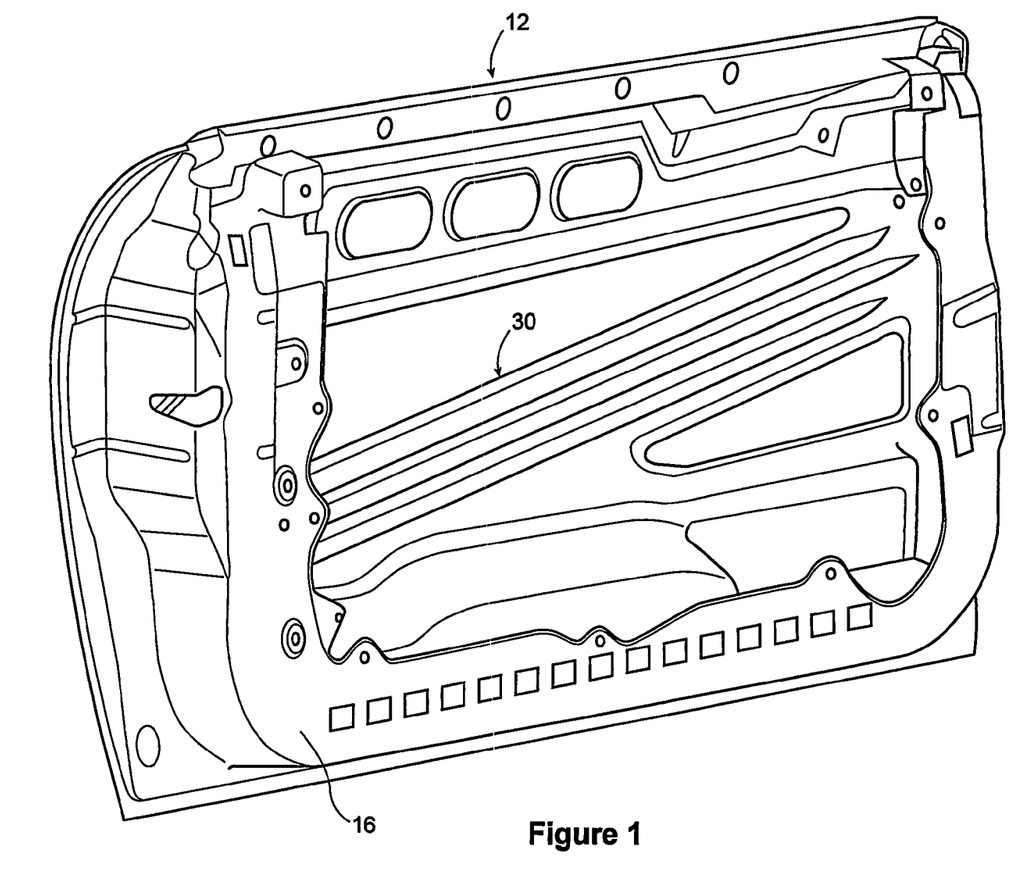
FIG. 1 is an assembly view of a structural door body according to the preferred embodiment.
Figure 4:
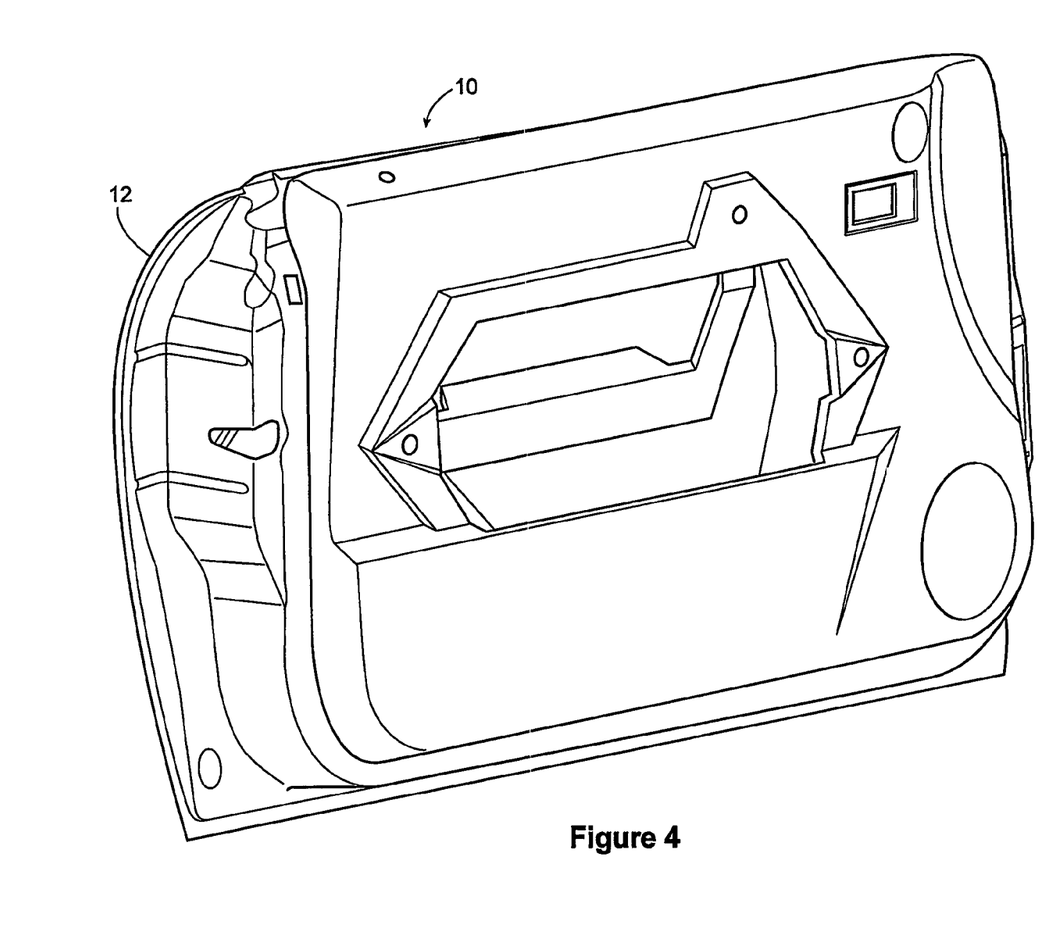
FIG. 4 is an assembly view, in perspective, of the door assembly shown in FIGS. 3A & 3B.

FIG. 4 shows an assembled motor vehicle door 10 which includes a structural door body 12 shown in isolation in FIG.

Figure 2A:
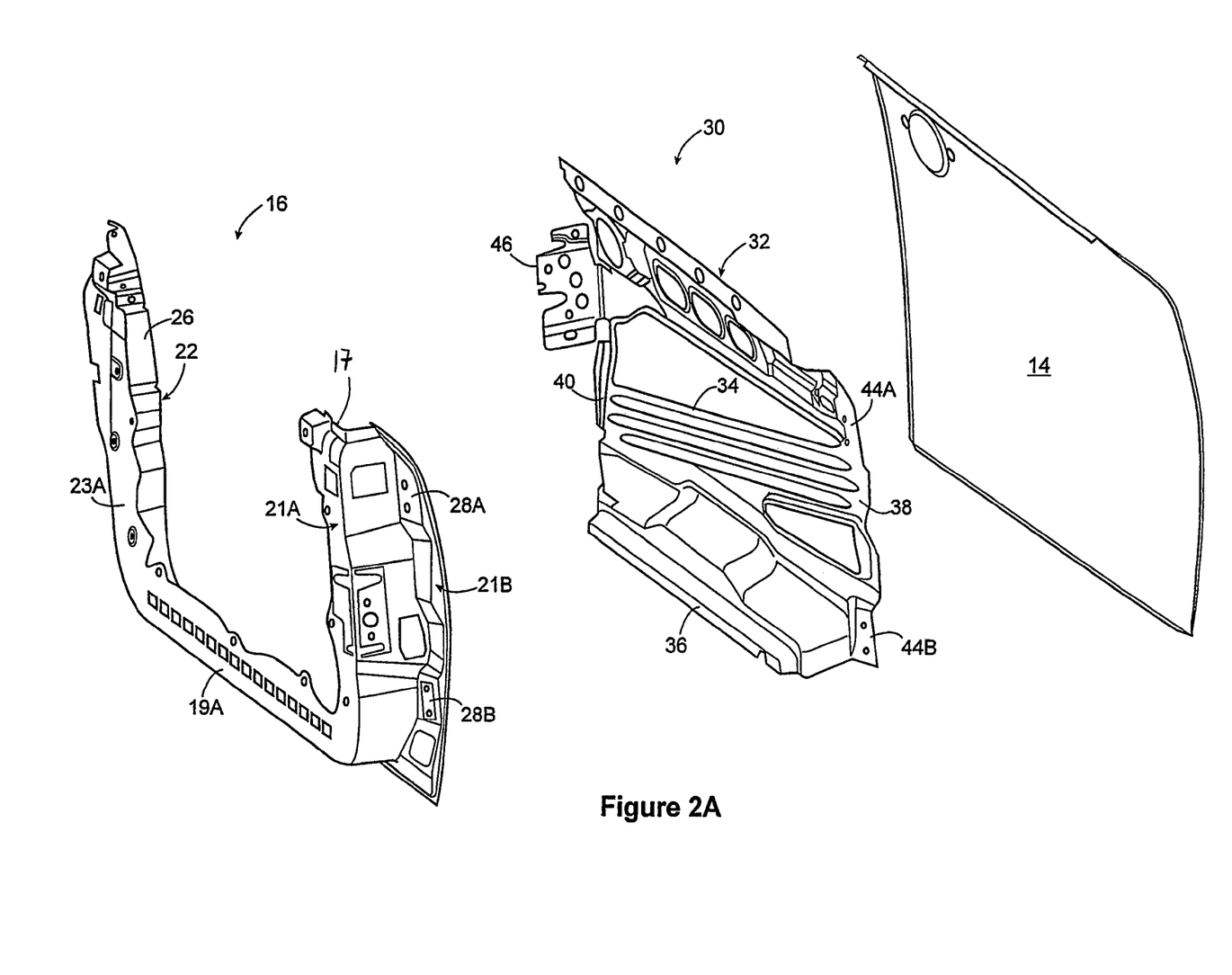
FIG. 2A is an exploded perspective view of the structural door body shown in FIG. 1.
Figure 2B:
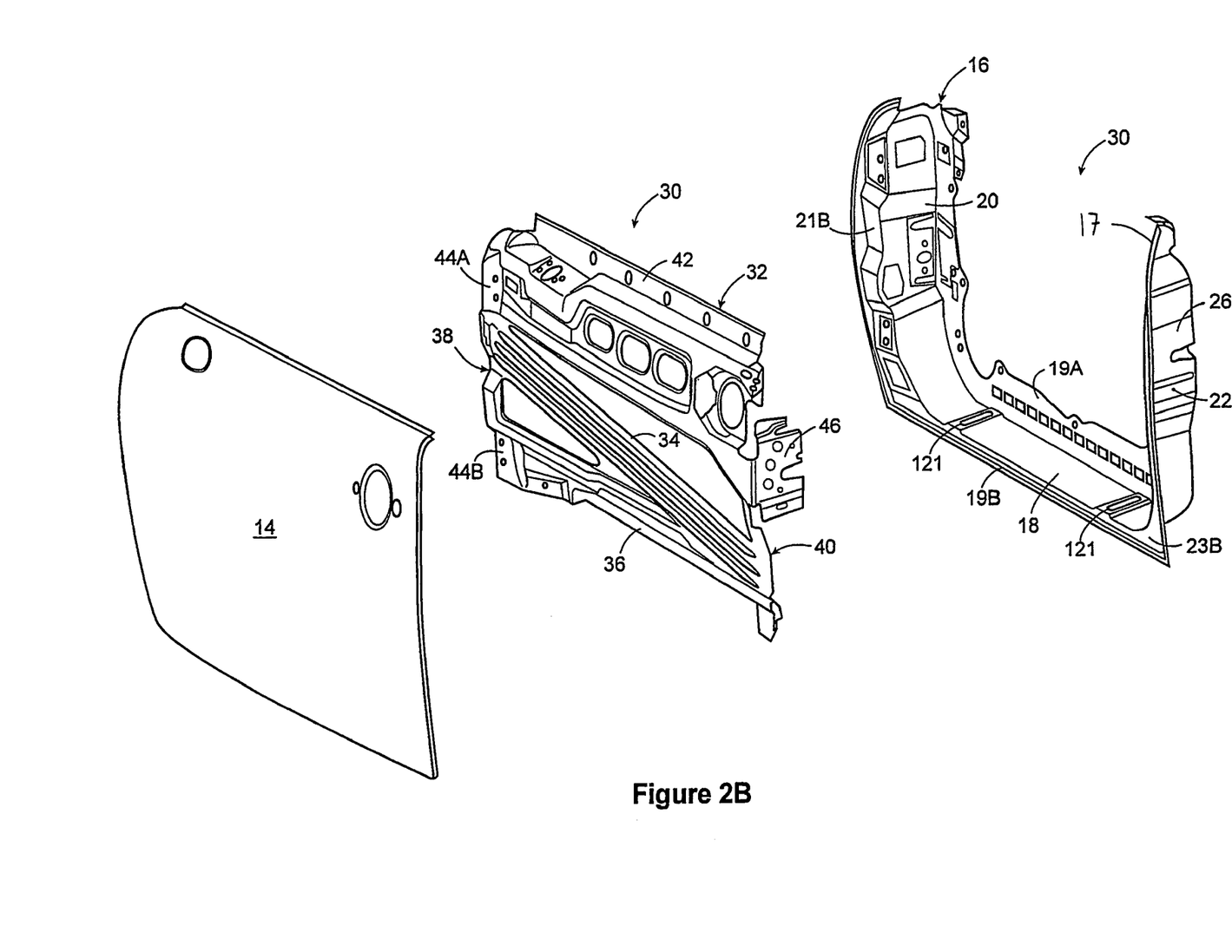
FIG. 2B is a reverse angle view of FIG. 2A.

1 (in an assembled view) and in FIGS. 2A & 2B (in exploded views). Referring to FIGS. 1, 2A & 2B, the structural door body 12 includes an outer sheet metal layer 14 in the form of a contiguous panel and an inner sheet metal layer 16 that is generally U-shaped. More particularly, the inner sheet metal layer 16 includes a bottom wall 18 and two contiguous opposing end walls 20, 22. Each of the walls 18, 20 and 22 has contiguous adjacent sidewall faces 19A, 19B, 21A, 21B and 23A, 23B. End wall 22 features a latch mounting surface 26 and sidewall 21 B features two hinge mounting surfaces 28A and 28B.

Note that the inner sheet metal layer 16 does not have a top member running parallel to the bottom wall 18 and thus the inner sheet metal layer 16 presents an open upper portion 17 and a very large opening 24. The outer and inner sheet metal layers 14 and 16 are preferably formed by metal stamping techniques as known in the art per se.

A structural door reinforcement panel 30 is disposed between the outer and inner sheet metal layers 14, 16 to provide structural reinforcement therefor. More particularly, the reinforcement panel 30 comprises top, middle and bottom cross members 32, 34, 36, respectively, and contiguous side peripheries 38 and 40. The side peripheries 38 and 40 abut and support sidewall faces 21B and 23B. Side periphery 38 includes two integral hinge reinforcement tabs 44A & 44B which mate with and reinforce hinge mounting surfaces 28A & 28B of inner sheet metal layer 16. The tabs 44A & 44B have fastening holes which align with fastening holes formed in the mounting surfaces 28A & 28B. Side periphery 40 includes an integral latch reinforcement extension 46 which mates with and reinforces latch mounting surface 26 of inner sheet metal layer 16.

The top and middle cross members 32 and 34 lie generally along the same plane as the side peripheries 38 and 40 and thus for the most part lie adjacent to the outer sheet metal layer 14. The middle cross member 34, which is corrugated and extends diagonally between the side peripheries 38 and 40, functions as a side impact crash bar. The top cross member 32 includes a narrow flange 42 (seen best in FIG. 2B) which extends inward somewhat to form one edge of a window guide, as discussed in greater detail below. The bottom cross member 36 extends inward to abut and support sidewall face 19A.

In assembly, the structural reinforcement panel 30 is preferably spot-welded against the inner sheet metal layer 16. Then, the outer sheet metal layer 14 is hemmed at its periphery against the inner sheet metal layer 16 as known in the art per se.

By incorporating the structural reinforcement panel 30 into the structural door body 12, the thickness of the outer and inner sheet metal layers 14, 16 can be reduced considerably and the need for tailor blanking reinforcements is eliminated. The structural reinforcement member 30 adds weight, but the net result is a weight and hence material cost savings considering the reduced thickness of the sheet metal layers, e.g., from about 1.6-2.0 mm to about 0.8 mm, and the fact that the inner sheet metal layer 16 does not have a top member running parallel to the bottom wall 18 thus providing the open upper portion 17 and the very large opening 24. Nevertheless, even though the inner sheet metal layer 16 is relatively thin and assumes a generally U-shaped form (thus eliminating the typical panel across the top of the inner sheet metal layer 16), the structural door body 12 has good torsional rigidity as a result of the reinforcement panel 30 and consequently has good deflection characteristics. (Deflection is typically measured by applying a vertical 1000 N force on the edge of an installed door opposite the hinges and measuring the resulting vertical deflection at the point where the force is applied). The reinforcement panel 30 can be provided, for instance, from stamped steel having a thickness of about 1.20 mm.

Figure 3A:
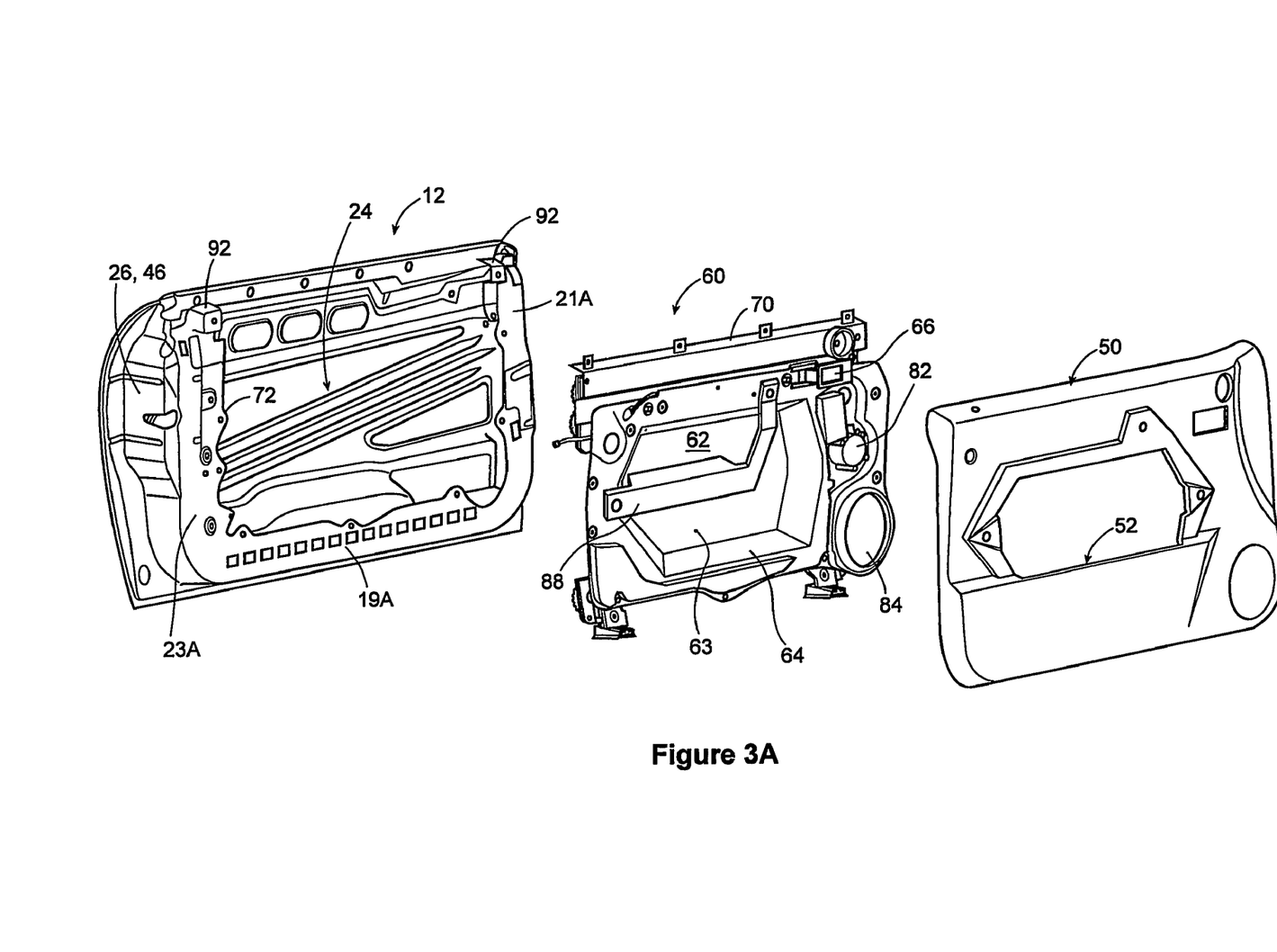
FIG. 3A is an exploded perspective view of a door assembly according to the preferred embodiment.
Figure 3B:
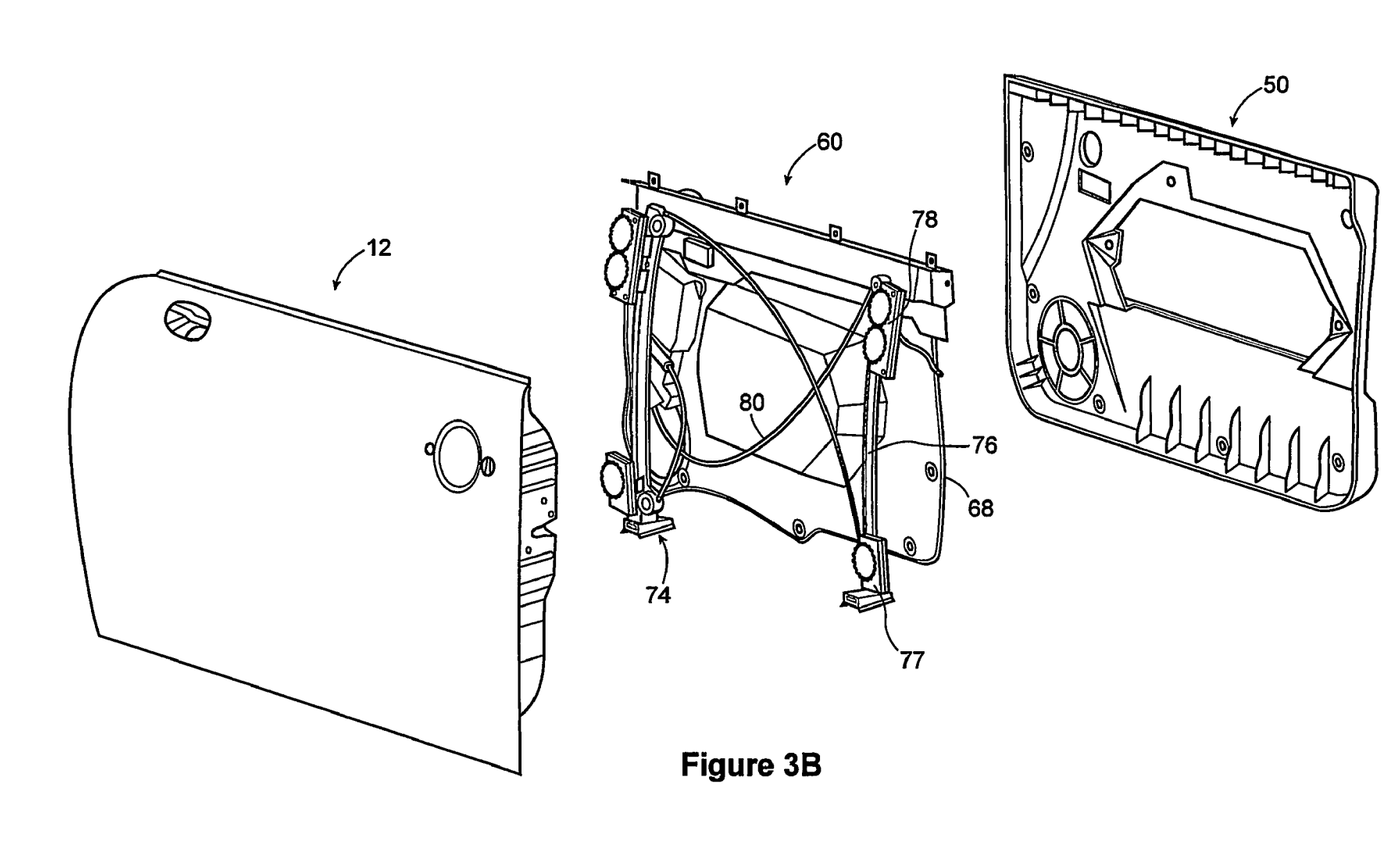
FIG. 3B is a reverse angle view of FIG. 3A.

Referring additionally to FIGS. 3A and 3B, the motor vehicle door 10 comprises the structural door body 12, discussed above, an interior trim panel 50 and a secondary trim/hardware carrier assembly, referred to herein in brief as carrier assembly 60.

The trim panel 50 extends over the inner sheet metal layer 16 and carrier assembly 60 to provide an aesthetically pleasing appearance of the door from the passenger compartment. The trim panel 50 is generally formed by a molding process, as known in the art per se. See, for example, U.S. Pat. Nos. 5,387,390; 5,397,409; 5,571,355; 5,885,662; 6,013,210; and 6,017,617. Trim panel 50 is secured in part to the sidewall faces 19A, 21A & 23A of inner sheet metal layer 16 via conventional trim fasteners such as snap fasteners, clips or screws.

The trim panel 50 is contoured in its lower region to present a map pocket region. At the upper edge of this region, a map pocket opening 52 is provided which can be formed during the molding process or cut or trimmed after molding. The carrier assembly 60 includes a secondary trim component 62, formed separately from panel 50, which cooperates with the panel 50 to provide a cohesive trim package. In the illustrated embodiment, the secondary trim component 62 provides a rear map pocket wall 63, a shelf structure 64, and an inside release handle well or housing 66. The inboard surface of each of these structures is preferably finished as a "class A" surface to aesthetically cooperate with the trim panel 50. After complete assembly of the door 10, the map pocket opening 52, rear wall 63, and shelf structure 64 provide a map pocket accessible from the passenger compartment for storage of items.

Figure 5:
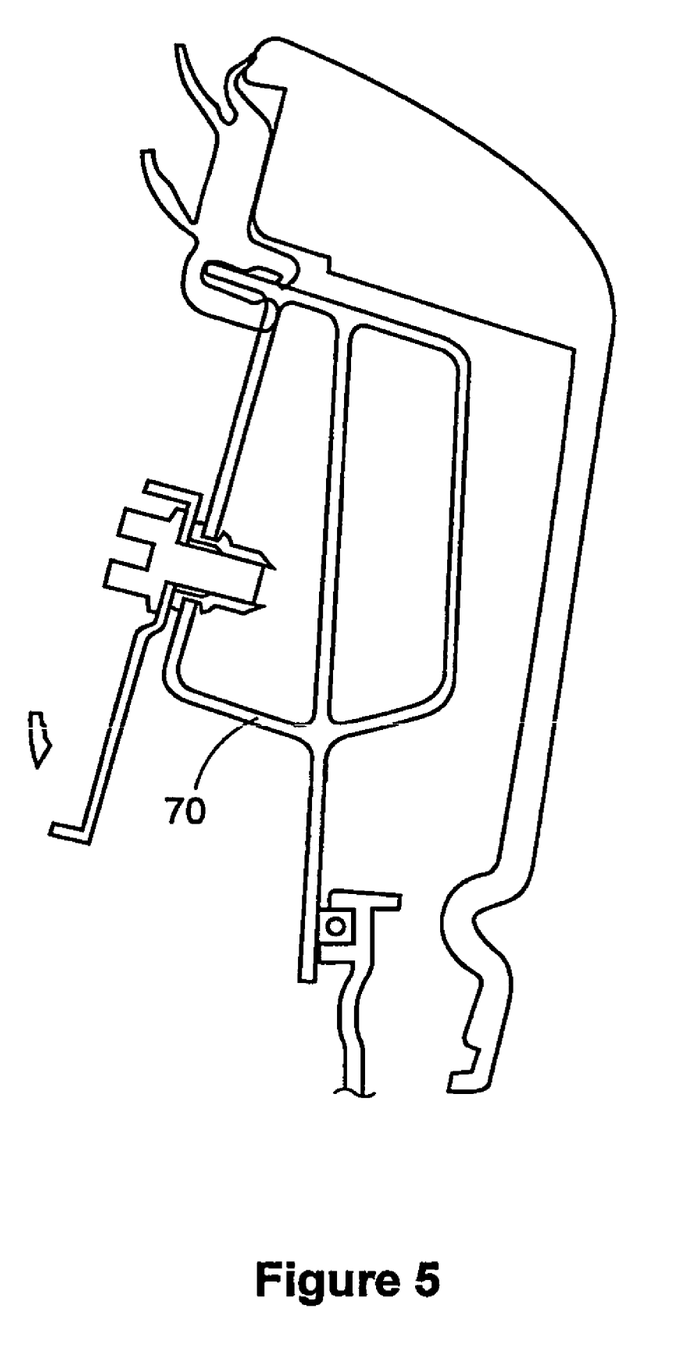
FIG. 5 is a cross-sectional view of a belt line loading member employed in the door assembly shown in FIGS. 3A & 3B.

In addition to the secondary trim component 62, the carrier assembly 60 includes a belt line loading member 70 which is preferably formed from lightweight extruded aluminum. A cross-sectional view of member 70 is shown in FIG. 5. Note that flange 71 is curved to accept the somewhat curved window. The curved shape can be imparted to extruded aluminum stock in a separate stamping step.

The carrier assembly 60 is preferably assembled away from the rest of the motor vehicle door 10, wherein the secondary trim component 62 is pre-fastened to the belt line loading member 70 via conventional fasteners. The outboard surface of the secondary trim component 62 and the remainder of its inboard surfaces do not need to be finished as class A surfaces because they are hidden from view by trim panel 50. These surfaces are thus used to carry a plurality of hardware components that are individually secured to the secondary trim component 62 or the belt line loading member 70. The secondary trim component 62 provides sufficient structural integrity to carry and transport the various hardware attached to it from a secondary assembly plant, where the carrier assembly 60 is assembled, to an original equipment manufacturer (OEM), where the carrier assembly 60 is mounted to the inner sheet metal layer 16.

As illustrated in FIGS. 3A and 3B, the carrier assembly incorporates the following hardware components:

A water sealing bead 68 on the outboard periphery of the secondary trim component 62 which seats against a flat portion of the inner sheet metal layer 16 when the carrier assembly is installed. The bead 68 may be applied by a robot as known in the art; can be an integrally formed part resulting, for example, from a foam co-injection process as known in the art; or can be a separately formed part that is friction-fitted into a detent formed around the outer perimeter of the secondary trim component. The carrier assembly 60 thus provides a water shielding function, insulating the interior trim and passenger compartment from the exterior environment. The carrier assembly also seals against dirt and provides acoustic isolation.

A window regulator, generally designated by ref. no. 74, which, in the illustrated embodiment, includes dual rails 76, lift plates 78 and an interconnecting drive system 80. The rails 76 are fixed at top portions thereof to the belt line loading member 70 which is capable of accepting the load imparted by the window regulator. The bottom portion of each rail 76 has an adjustment mechanism 77 which is used to adjust the vertical and lateral positioning of the rails 76 when the carrier assembly is installed to the structural door body, as discussed in greater detail below.

A window regulator motor 82 which is installed on the dry side of the secondary trim component 62 with only a gearbox output shaft extending into the wet side, such that all of the electrical connections to the motor and other electrical components can be carried or made on the dry side.

A speaker (not shown), mounted in an integrated housing 84 in the secondary trim component 62.

An inside release handle or lever 86 which is hinged against the belt line loading member 70. Rods or cables (not shown) may be attached to this lever for actuating the door.

An armrest 88. Preferably, at least one portion of the armrest is mounted to the belt line loading member 70.

In the preferred embodiment, the door 10 is assembled as follows:

First, the structural door body 12 is assembled as described above and the carrier assembly 60 is contemporaneously assembled separately.

Next, a door latch (not shown) is mounted to the latch mounting surface 26 and underlying reinforcement extension 46 of the structural door body 12. Easy access is provided to this area as a result of the large opening 24. The outer handle for the door and a door check (not shown) are preferably also mounted to the structural door body 12.

The carrier assembly 60 can then be mounted to the structural door body 12. The belt line loading member 70 is mounted to the inner sheet metal layer 16 at a plurality of fastening locations 92 which spatially fix the orientation of the member 70. A variety of connections can then be made, e.g., the wiring harness.

At this stage the window regulator rails 76 are mounted to the structural door body. The upper portion of each rail is attached to the belt line loading member 70 whilst the adjustment mechanism 77 enables a pivotal movement of the window regulator about its fixation against the belt line loading member.

Figure 6:
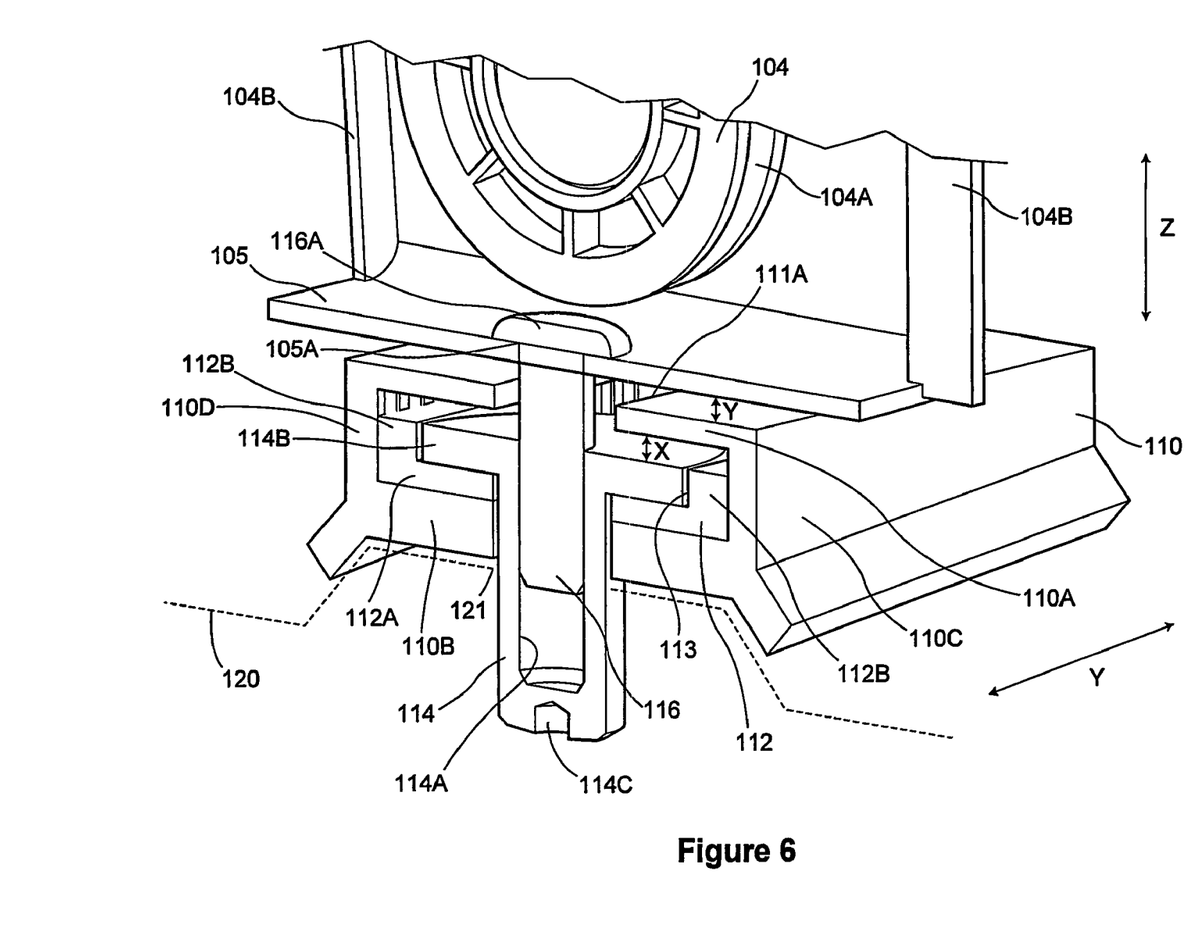
FIG. 6 is a fragmentary perspective view of a window regulator adjustment mechanism employed in the door assembly shown in FIGS. 3A & 3B.
Figure 7:
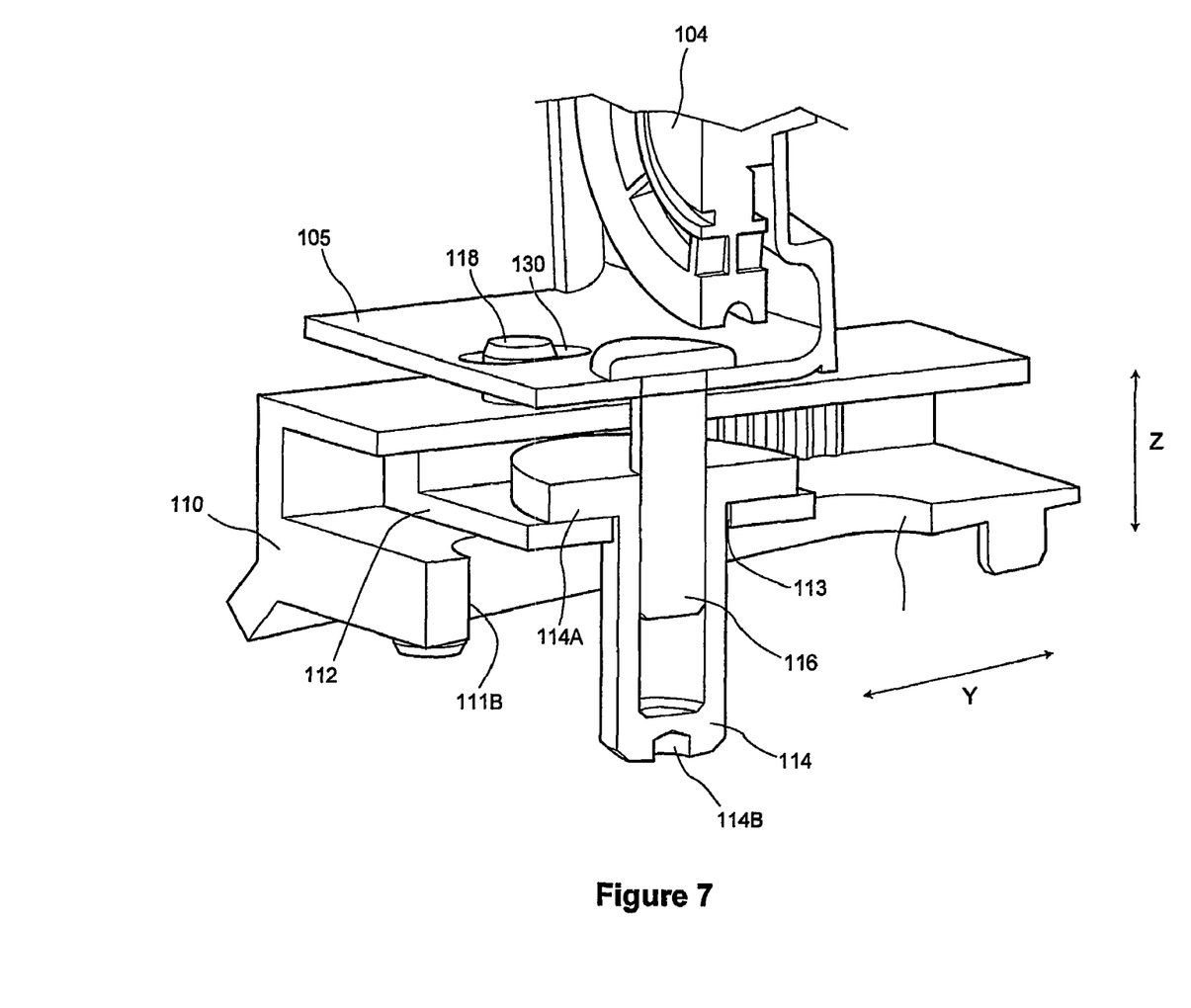
FIG. 7 is another fragmentary perspective view of the window regulator adjustment mechanism shown in FIG. 6.

More specifically, as shown in FIGS. 6 and 7, the lower end of each rail 76 is integrally connected to a platform 105, which is provided with a hole 105a therein. The rails 76 extend in an essentially vertical direction, usually referred to as the Z-direction. The adjustment device 77 comprises a profiled base element 110, preferably made of a plastics material. The base element 110 is positioned on the bottom wall 18 of the structural door body 12 which is provided with struts 120, each having a slot or hole 121.

The base element 110 comprises an upper side 110a, a lower side 110b and walls 110c, 110d connecting the upper side and the lower side. Lower side 110b is formed with two wing-like extensions extending downwardly at an angle from the lower side 110b. In the upper and lower sides of the base element 110, elongate holes 111a, 111b are respectively provided. The elongate holes 111a, 111b extend essentially horizontally and perpendicularly to the direction of motion of the (not shown) vehicle. This direction is usually referred to as the Y-direction.

A slider 112 is positioned within the base element 110, resting on the inside of lower side 110b. The slider 112 comprises a base portion 112a, extending horizontally, and two walls 112b, extending essentially in Z-direction. The slider 112 is also preferably made of a plastics material. The slider 112 is formed with a hole 113 in its base portion, which is aligned with the elongate holes 111a, 111b.

A screw 114 provided with an inner threading 114a extends through the hole 113 in the slider 112 and the elongate hole 111b in the lower side of base element 110. The screw 114 is provided with a first screw end 114b, formed as a screw head, and a second screw end 114c, formed with a slot, in which means for turning the screw can be engaged. The first end 114b of the screw 114 rests on the base portion of the slider 112. The screw 114 furthermore extends downwardly through hole 121 provided in door section 120, this hole 121 being aligned with holes 113 and 111b.

A bolt 116 extends downwardly through the hole 105a in platform 105 and is fixedly attached to the platform. Bolt 116 is formed with a bolt head 116a resting on the platform 105. The lower end of the bolt 116 is formed as a threaded rod which engages the inner threading of screw 114. By means of turning the screw 114 (for example by inserting an appropriate turning means in the slot formed in the second screw end 114c), an adjustment of screw 114 in Z-direction can be achieved.

Figure 8:
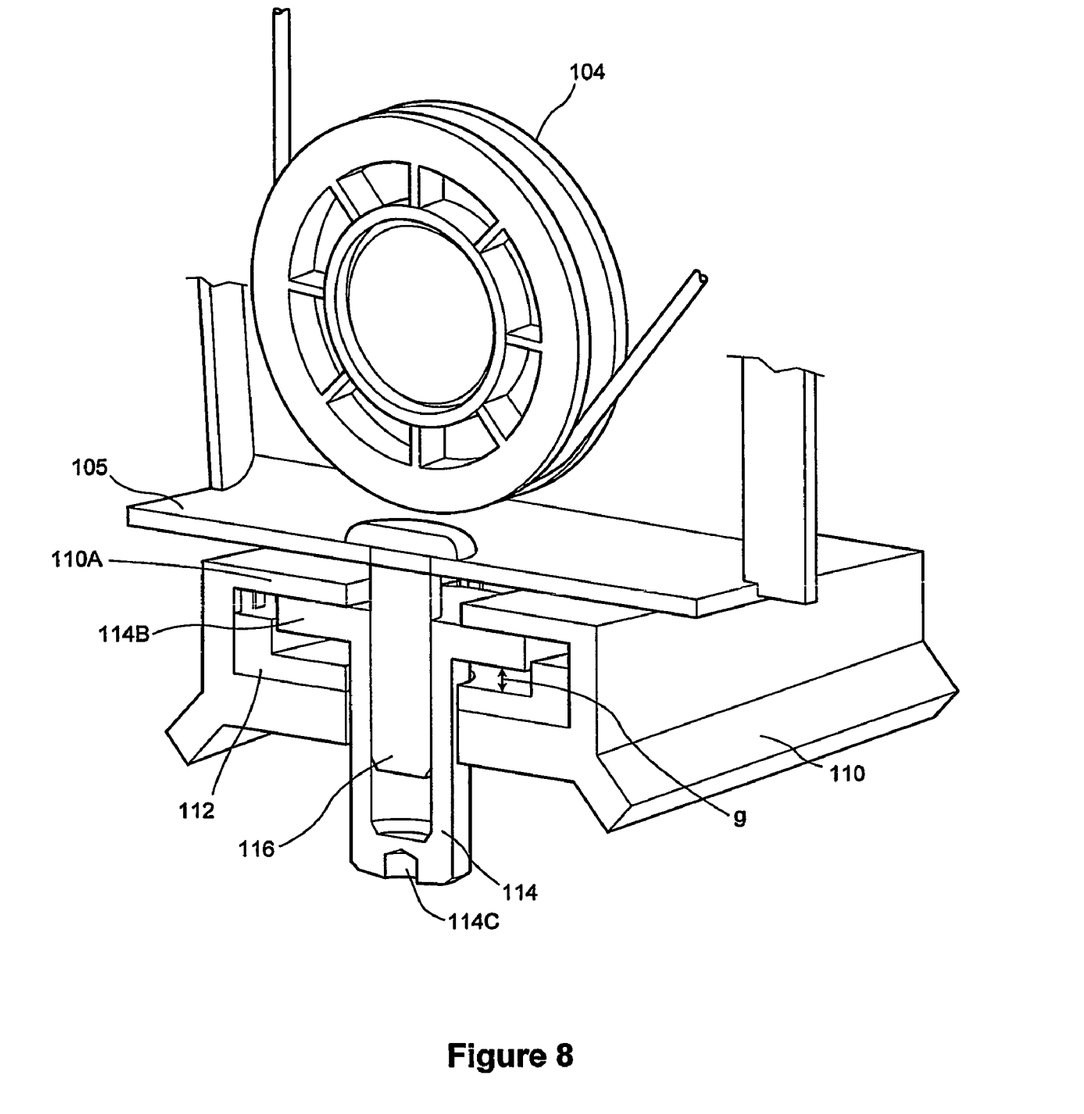
FIG. 8 is a fragmentary perspective view of the window regulator adjustment mechanism of FIG. 6, shown in an initial or delivery state.

Referring to FIG. 8, the adjustment device according to the invention is shown in its delivery state. As can be seen, the head 114b of screw 114 abuts the inside of upper side 110a of base element 110. Furthermore, the outside of upper side 110a abuts platform 105. Thus, there are, initially, no gaps between screw head 114b and upper side 110a as well as upper side 110a and platform 105. Rather, in the initial state, a gap g is provided between slider 112 and head 114b.

The screw 114 is thus initially, i.e. in its delivery state, in a position, where it engages the inside of the upper part 110a of the base element 110. I.e. the gap x as indicated in FIG. 6 is minimized. The same holds for the gap y depicted in FIG. 6 between the upper side 110a, of the base element and platform 105. In this position, i.e. screw 114 not engaging the slider 112, the slider is slideable within the base element 110 in Y-direction. Thus, the pivotal movement of the window regulator, as mentioned above, about its fixation in the upper section of the vehicle door, can be achieved. By means of such a sliding movement of slider 112 a desired angle of the guide rails 76 can be effectively set. In order to define specific positions of the slider 112 in Y-direction, the insides of walls 110c, 110d and the outsides of walls 112b are provided with interacting notches.

On the upper side 110a of base element 110 there is provided at least one pin-like element 118 engaging an elongate hole 130 formed in platform 105. The elongation of hole 130 extends essentially in Y-direction. Thus, a rotation of the guide rail relative to the base element 110 in case of a turning of screw 114 can be prevented.

By turning screw 114 relative to bolt 116, screw 114 begins a downward motion relative to the bolt 16 and platform 105, whereby the gaps x and y are created. When the gaps x and y are fully formed, the head 114b of the screw begins engaging slider 112. By further turning screw 114, a fixation of slider 114 within the base element 110 can be achieved. In this engaging relationship, a further sliding movement of slider 112, and thus, a further pivotal movement of guide rails 114b is effectively prevented.

At the same time, a tolerance compensation in Z-direction is achieved by the adjustment mechanism 77 as a result of a pressure force (essentially in Z-direction) between strut 120 and platform 105 of the window regulator. Thus, any deviations or tolerances in Z-direction, for example of the rails 76 or of the base element 110, can be effectively compensated.

In an alternative embodiment, not shown in the figures, the outside of screw 114 extending downwardly from hole 121 can be provided with a thread. This enables a nut (not shown) with a corresponding inner thread to be engaged on said outside of screw 114, whereby the fixation of screw 114 to strut 120 can be further enhanced.

After the window regulator is mounted, the window glass can be mounted to the window regulator via clamps as known in the art per se. Afterwards, the interior trim panel is mounted to the structural door body 12 and the carrier assembly 70 via conventional mounting techniques. Finally, the assembled door can be mounted to the hinges of the vehicle.

Those skilled in the art will appreciate that a variety of modifications can be made to the embodiments described herein without departing from the spirit of the invention.

The invention claimed is:

1. A structural automotive door body, comprising:
   an inner sheet metal layer, the inner sheet metal layer including a latch mounting surface and at least one hinge mounting surface;
   an outer sheet metal layer; and
   a structural reinforcement member disposed between the inner and outer sheet metal layers to reinforce the inner and outer sheet metal layers and providing at least one hinge reinforcement and a latch reinforcement;
   wherein said inner sheet metal layer includes a pair of spaced apart end walls connected only by a bottom wall extending between said pair of spaced apart end walls thereby defining a substantially U-shaped structure having an open upper portion and said structural reinforcement member includes a top member that abuts said outer sheet metal layer and extends thereacross adjacent said open upper portion of said U-shaped structure of said inner sheet metal layer.

2. A structural automotive door body according to claim 1, wherein said structural reinforcement member includes a side impact beam.

3. A structural automotive door body according to claim 2, wherein said structural reinforcement member includes a bottom cross-member that abuts and supports the inner and outer sheet metal layers.

4. A structural automotive door body according to claim 3, wherein said structural reinforcement member is welded to said inner sheet metal layer.

5. A structural automotive door body according to claim 4, wherein said outer sheet metal layer is hemmed to said inner sheet metal layer.

6. A structural automotive door body according to claim 1, wherein said structural reinforcement member includes a middle cross member, a bottom cross member, and continuous side peripheries, said top member reinforcing said outer panel, said middle cross member extending between said side peripheries to function as a side impact beam, said bottom cross-member abutting and reinforcing said inner and outer sheet metal layers; and wherein said side peripheries include at least one hinge reinforcement and a latch reinforcement.

7. A structural automotive door body, comprising:
   an inner sheet metal layer including a pair of spaced apart end walls connected only by a bottom wall extending between the pair of spaced apart end walls thereby defining a substantially U-shaped structure having an open upper portion;
   an outer sheet metal layer;
   at least one of the inner and outer sheet metal layers including a latch mounting surface and at least one hinge mounting surface;
   a structural reinforcement member disposed between the inner and outer sheet metal layers, said member comprising top, middle and bottom cross-members and contiguous side peripheries, wherein:
   said top member abuts and extends across said outer sheet metal layer adjacent the open upper portion of said U-shaped structure of said inner sheet metal layer;
   said middle cross member extends between said side peripheries to function as a side impact beam;
   said bottom cross-member abuts and supports said inner and outer sheet metal layers; and
   said side peripheries include at least one hinge reinforcement and a latch reinforcement.

8. A door assembly, comprising:
   an inner sheet metal layer defining a substantially U-shaped structure, the inner sheet metal layer including a latch mounting surface and at least one hinge mounting surface;
   an outer, substantially planar, sheet metal layer;
   a structural reinforcement member disposed between the inner and outer sheet metal layers for reinforcing the inner and outer sheet metal layers and providing at least one hinge reinforcement and a latch reinforcement;
   a carrier assembly, including a belt-line loading member connected to a non-structural hardware carrier having at least a window regulator mounted thereon, said carrier assembly being mounted to at least the structural reinforcement member and covering the U-shaped area; and
   a trim component for covering said carrier assembly.

9. A door assembly according to claim 8, wherein said hardware carrier includes a secondary trim component which provides a shelf structure for a map pocket and said trim component includes a wall for said map pocket.

10. A door assembly according to claim 8, wherein said window regulator includes at least one rail having one end mounted to said belt-line loading member and means for adjusting the lateral and vertical position of the other end of said at least one rail.

11. A structural automotive door body, comprising:
    an inner sheet metal layer, the inner sheet metal layer including a pair of spaced apart end walls connected only by a bottom wall extending between the pair of spaced apart end walls, said inner sheet metal layer also including a latch mounting surface and at least one hinge mounting surface;
    an outer sheet metal layer; and
    a structural reinforcement member disposed between the inner and outer sheet metal layers, said structural reinforcement member including top, middle and bottom cross-members and continuous side peripheries, said top member reinforcing said outer panel, said middle cross member extending between said side peripheries to function as a side impact beam, said bottom cross-member abutting and reinforcing said inner and outer sheet metal layers; and wherein said side peripheries include at least one hinge reinforcement and a latch reinforcement.

\* \* \* \* \*